United States Patent [19]

Suzuki

[11] Patent Number: 4,691,713
[45] Date of Patent: Sep. 8, 1987

[54] ELECTRONIC CLINICAL THERMOMETER
[75] Inventor: Takashi Suzuki, Nara, Japan
[73] Assignee: Sharp Kabushiki Kaisha, Osaka, Japan
[21] Appl. No.: 830,081
[22] Filed: Feb. 18, 1986
[30] Foreign Application Priority Data Feb. 21, 1985 [JP] Japan .................. 60-34131

[51] Int. Cl.⁴ .............................. A61B 5/00
[52] U.S. Cl. .................... 128/736; 374/104
[58] Field of Search ............ 128/736; 374/102-103, 374/104, 111-112

[56] References Cited

U.S. PATENT DOCUMENTS 4,161,880 7/1979 Prosky ........................ 128/736 X
4,551,031 11/1985 Ishikawa et al. ................ 374/117
4,572,213 2/1986 Kawahara ........................ 128/736

Primary Examiner—Kyle L. Howell
Assistant Examiner—Angela D. Sykes
Attorney, Agent, or Firm—Birch, Stewart, Kolasch & Birch

[57] ABSTRACT

An electronic clinical thermometer comprises a temperature sensing device for measuring actual temperature values, a prediction circuit responsive to the temperature sensing device for calculating a prediction temperature based on the actual temperature values, and an output control device for selectively outputting the actual temperature values or the prediction temperature value depending on the changes of the actual temperature values.

4 Claims, 3 Drawing Figures

ELECTRONIC CLINICAL THERMOMETER

BACKGROUND OF THE INVENTION

The present invention relates to a clinical thermometer and, more particularly, to an electronic clinical thermometer for selectively outputting an actually measured temperature or a prediction temperature obtained by predicting a thermal equilibrium temperature between a temperature sensing member and an object.

In the conventional electronic clinical thermometer, a thermal equilibrium (balanced) temperature is predicted to thereby output the possible temperature of an object before the balanced condition between a temperature sensing member and the object is actually attained. However, for example, when temperature accuracy of the thermometer is exactly determined, the temperature of a sample, say, water must be actually measured. In the conventional thermometer, the temperature measurement accuracy therefore cannot be checked exactly. The conventional thermometer thus cannot provide an actual temperature.

SUMMARY OF THE INVENTION

Accordingly, it is an object of the present invention to provide an improved electronic clinical thermometer for selectively outputting an actually measured temperature or a prediction temperature.

It is another object of the present invention to provide an improved electronic clinical thermometer for selectively outputting an actually measured temperature or a prediction temperature, so that the prediction temperature is outputted during measurement and selectively the actually measured temperature can be outputted if desired.

Briefly described, in accordance with the present invention, an electronic clinical thermometer comprises temperature sensing means for measuring actual temperature values, prediction means responsive to the temperature sensing means for calculating a prediction temperature value based on the actual temperature values, and output means for selectively outputting the actual temperature values or the prediction temperature depending on the largeness of the changes of the actual temperature values.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
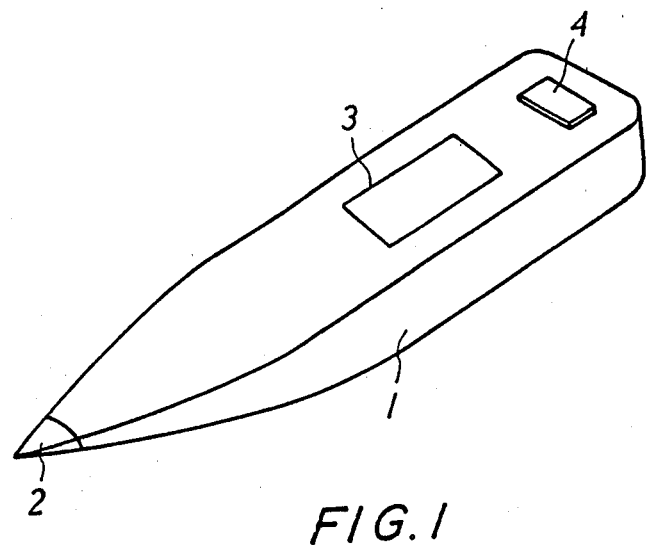
FIG. 1 is a perspective view of an electronic clinical thermometer according to the present invention.

FIG. 1 is a perspective view of an electronic clinical thermometer 1 of the present invention. In the preferred embodiment of the present invention, an actual temperature of a sample, for example, water, can be measured to determine the temperature measurement accuracy of the thermometer.

Referring to FIG. 1, the body of the thermometer 1 comprises a temperature sensing means 2 at its tip. The temperature sensing means 2 comprises a thermister or the like for sensing the temperature. It is directly touched with an object such as human body. A display 3 is provided for displaying the temperature detected by the sensing means 2 by changing the temperature data into the temperature value of three digits in the Centigrade degrees. A power switch 4 is provided.

When the power switch 4 is turned ON, the display 3 is operated to selectively display a prediction temperature or an actually measured temperature depending on the largeness of temperature gradient during measurement.

Figure 2:
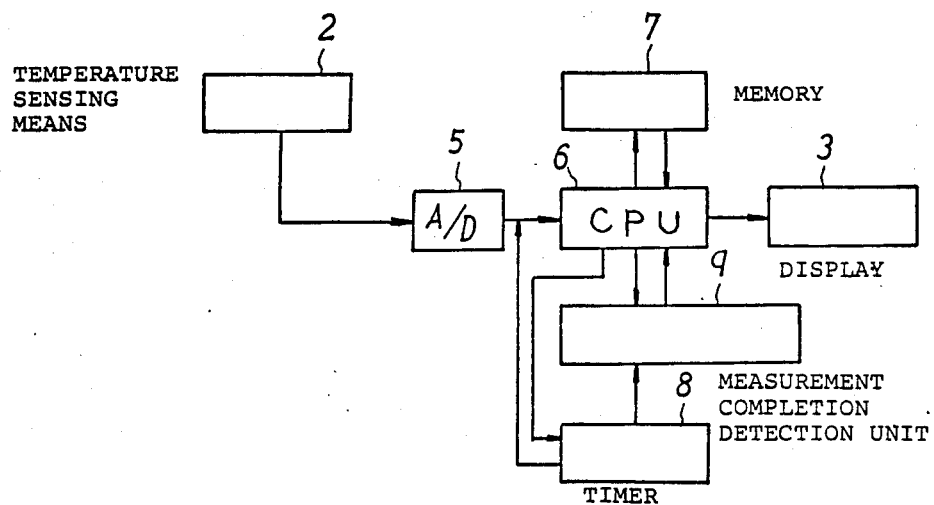
FIG. 2 is a block diagram of the control circuit of the thermometer of FIG. 1.

FIG. 2 is a block diagram of a control circuit of the thermometer of the present invention.

The analog signal from the temperature sensing means 2 is forwarded to an A/D converter 5 to provide the corresponding digital signals. The digital signals are inputted to a Central Processing Unit (CPU) 6. Responsive to the electric signals inputted, the CPU 6 calculated temperature values. The calculation program is stored within a memory 7 such as a read only memory (ROM).

The CPU 6 is operated to determine the changes of the temperature values and control the display of the actually measured temperature or the prediction temperature assumed to be a possible temperature. If it concludes to allow the actual temperature to be displayed, the calculated temeperature values are directly introduced to the display 3 from the CPU 6. Otherwise, if it allows the predicted temperature to be displayed, it calculates the prediction temperature based on the actual temperature values, so as to display the prediction temperature in the display 3.

In FIG. 2, a timer 8 and a measurement completion detection unit 9 are provided for detecting, in combination, whether or not measurement has been completed. The detection unit 9 subsequently receives the temperature values calculated in the CPU 6. After a temperature value is entered to the detection unit 9 and unless another temperature higher than the entered temperature value by a predetermined difference is entered into it within a predetermined time length, the detection unit 9 provides a measurement completion signal to the CPU 6.

Figure 3:
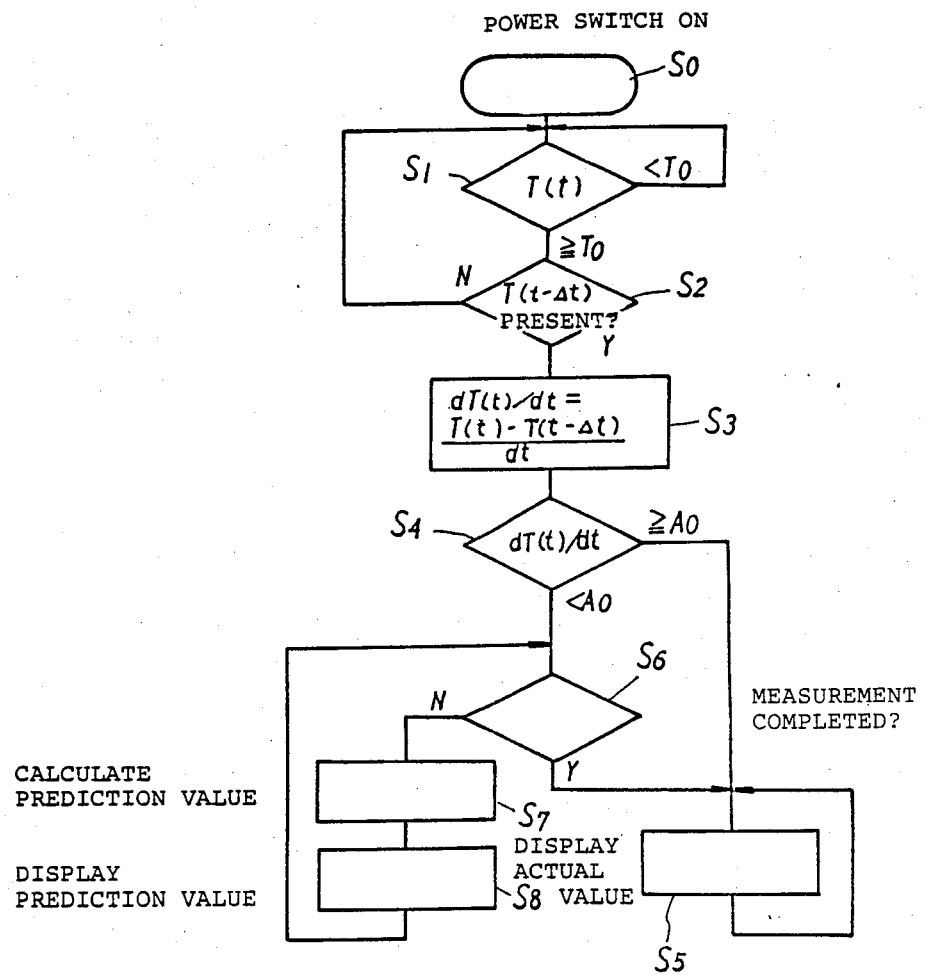
FIG. 3 is a flow chart of the operation of the thermometer of FIG. 1.

FIG. 3 is a flow chart of selectively displaying the actual temperature or the prediction temperature.

Step S0: The power switch 4 is turned ON.

Step S1: A time t=0 when the temperature sensing means 2 is assumed to get in touch with the object to be measured. A temperature T at time t is represented by T(t) herein. In the course of measurement, the temperature T(t) exceeds a threshold T.

Step S2: If the temperature T(t) exceeds the threshold T, it is determined whether a temperature T(t−delta t) at a very much short time "delta t" prior to the time of exceeding (the present) is inputted.

Step S3: This step is selected if the temperature T(t−delta t) is inputted. A temperature gradient of dT(t)/dt from the very much short time "delta t" to the present is calculated. Here, dT(t)/dt=T(t)−T(t−delta t)/dt.

Step S4: Depending on the fact whether or not the temperature gradient dT(t)/dt is equal to or more than a threshold A0, either the actual temperature or the prediction temperature is determined to be displayed.

Step S5: If dT(t)/dt is equal to or more than A0, this step S5 is selected to display the actual temperature.

Step S6: Otherwise, if dT(t)/dt is less than A0, step S6 is selected.

Step S7: In the case of having not completed measurement, the prediction temperature is calculated in step S7.

Step S8: The prediction temperature is displayed.

It is to noted that step S4 is provided in view of the fact that it takes much less time for the water to converge it temperature rather than the human body.

The prediction temperature is calculated as follows:
T0: the temperature of the body of the thermometer prior to measurement, normally, the room temperature;
Tf: the temperature of the object to be measured;
alpha: the time constant of the thermister.

A temperature T(t) at a time t can be represensted by the following equation.

$$T(t) = (T_f - T_0)\left(1 - e^{-\frac{t}{\alpha}}\right) + T_0 \quad (1)$$

The equation (1) is differential calculated with the fuction of time to obtain the following equation (2).

$$\frac{dT(t)}{dt} = \frac{1}{\alpha}(T_f - T_0)e^{-\frac{t}{\alpha}} \quad (2)$$

Based on equations (1) and (2), the temperature T(t) of the object is represented by the following.

$$T_f = T(t) + \alpha \frac{dT(t)}{dt}$$

In connection with a time t, the above equation is differential approximated with the very much short time "delta t" to calculate the following.

$$T_f = T(t) + \frac{\alpha}{\Delta t}(T(t) - T(t - \Delta t))$$

Therefore, by storing the time constant "alpha" in the memory 7, a prediction temperature Tf can be calculated based on the temperature T(t) at the time t and the temperature T(t−delta t) at the time (T−delta t).

In step S6, even if the temperature gradient dT(t)/dt is less than the threshold A0, the measurement completion may be detected when the temperature values are unchanged. In step S5, the actual temperature is displayed. This is because the actual temperature is finally measured even if the accuracy of the prediction temperature may be varied depending on the human body to be measured. As a result, prediction can be possible in a short time and, in addition, the actual temperature can be measured even in a relatively long time, advantageously.

To discriminate the output of the actual temperature from that of the prediction temperature, the above-described system of using the temperature gradient dT(t)/dt may be replaced by anyone of the following alternatives.

A. the sum of temperature gradients from a first temperature T(t) exceeding a first threshold T0 to a second temperature T(t) exceeding a second threshold T1. This temperature gradient is referred to as a first type temperature gradient.

B. the mean value of the first type temperature gradients.

C. the maximum of the first type temperature gradients.

D. a temperature gradient dT(t)/dt which just exceeds a threshold gradient dTa/dt. It is referred to as a second type temperature gradient.

E. the sum of the temperature gradients within a predetermined time, say, 5 seconds, after the second type temperature gradient is attained.

F. the mean value of the temperature gradients within a predetermined time after the second type temperature gradient is attained.

G. the maximum of the temperature gradients within a predetermined time after the second temperature gradient is attained.

Any other idea may be possible to detect the temperature convergence. For example, the detection of the temperature convergence may use the detection of remarkably reducing the temperature gradients in a specific time from a measurement start and stabilizing the temperature.

Within the knowledge of the present invention, when, upon activating the power switch 4, the temperature is outside a range capable of displaying the lowest temperature such as about 34.5 degrees Centigrade or so and, in addition, the temperature is stable, the actual temperature is determined to be automatically displayed.

While only certain embodiments of the present invention have been described, it will be apparent to those skilled in the art that various changes and modifications may be made therein without departing from the spirit and scope of the present invention as claimed.

What is claimed is:

1. An electronic clinical thermometer comprising:
temperature sensing means for sensing actual temperature values;
prediction means responsive to said temperature sensing means for calculating a prediction temperature value based on the actual temperature values; and
output control means for selectively outputting the actual temperature values or the prediction temperature value depending on the changes of the actual temperature values, said prediction temperature value taking less time for output than said actual temperature values.

2. The thermomemer of claim 1, wherein said output control means comprises means for calculating and comparing the temperature gradients of the actual temperature values with reference to a threshold.

3. The thermometer of claim 1, further comprising measurement completion detection means coupled to said temperature sensing means, said measurement completion detection means generating a measurement completion signal when temperatures measured by said temperature sensing means do not increase for a predetermined period of time.

4. The thermometer of claim 1, wherein said control means selectively outputs the actual temperature values or the prediction temperature values depending on the rate of change of the actual temperature value.

* * * * *